Dec. 17, 1935.  J. A. MILLER  2,024,942
SOUND RECORDING SYSTEM
Filed April 17, 1931   3 Sheets-Sheet 1

INVENTOR
James A. Miller
BY
Harris D. Hineline
ATTORNEY

Dec. 17, 1935. J. A. MILLER 2,024,942
SOUND RECORDING SYSTEM
Filed April 17, 1931 3 Sheets-Sheet 2

INVENTOR
James A. Miller
BY
ATTORNEY

Dec. 17, 1935.  J. A. MILLER  2,024,942
SOUND RECORDING SYSTEM
Filed April 17, 1931   3 Sheets-Sheet 3

INVENTOR
James A. Miller
BY
ATTORNEY

Patented Dec. 17, 1935

2,024,942

UNITED STATES PATENT OFFICE 2,024,942

SOUND RECORDING SYSTEM

James Arthur Miller, New York, N. Y., assignor to United Research Corporation, New York, N. Y., a corporation of Delaware Application April 17, 1931, Serial No. 530,766

13 Claims. (Cl. 179—100.3)

This invention relates to sound recording systems, and particularly to a device for making sound records upon photographic film.

In recording sound upon film by photographic methods, difficulty has been experienced in securing accurate records of the desired character, free from extraneous influences, with the record amplitude of the desired magnitude from a given vibration input, and under easy and accurate control.

An object of this invention is to adjust the amplitude of movement of the recording light edge in response to a given amplitude of vibration of the sound energy impressed upon the device.

Another object is to control the tendency of response of the light control system and the exciter lamp to vibrations produced by the film handling mechanism, and to other random vibrations.

Another object is to facilitate the ease of operation and adjustment of the recorder system.

In the prior art of recording sound vibrations upon photographic film, it has been customary to utilize such systems as a light valve consisting of a pair of wires, carrying current, in a strong magnetic field, the separation of the wires being modified by the current flowing in them, to permit the passage of more or less light; or, to vibrate a mirror or other system for moving a beam of light across the width of the sound track upon the film.

This invention utilizes an aerial image of a narrow light source, preferably a luminous filament, which may, if desired, be optically reduced to appropriate small dimensions. The aerial image is focussed at a point adjacent a shutter member having an edge inclined at a small angle with the center line of the aerial image of the filament or light source. Movement of the shutter member then intercepts more or less of the aerial image, the remainder of which is sharply focussed upon the recording film. The shutter blade is vibrated in accordance with sound vibration by any convenient system, such as a magnetic or other actuating means, and the amplitude of change of the recording light produced by the unintercepted image with a given amplitude of sound energy is varied by varying the angle between the center line of the aerial image and the edge of the shutter blade.

It is essential, however, that the aerial image be stable in position, since vibration of the image with respect to the shutter will also vary the recording light, resulting in a record of extraneous vibrations. This invention accordingly provides a simple means for steadying the light system.

It also provides simple and convenient control devices which simplify and facilitate the recording operation.

The objects of this invention are thus obtained by varying the position of the shutter blade with respect to the light source; by controlling the vibratory tendencies of the light source, and by incorporating simple control and adjustment means within the recording device.

Other objects and structural details of this invention will be apparent from the following description when read in connection with the accompanying drawings, wherein.

Figure 1:
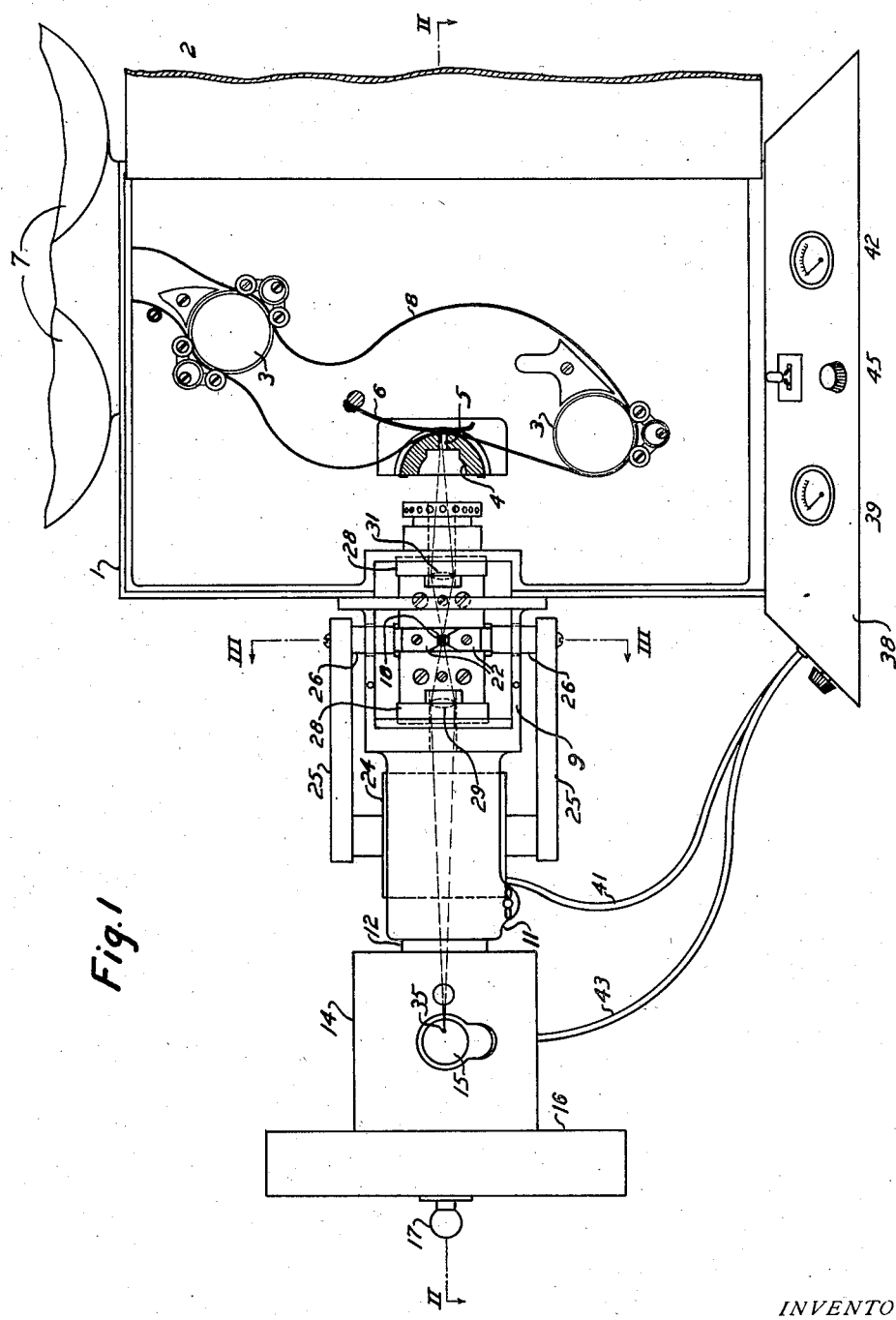
Fig. 1 is a front view of the system of this invention.
Figure 2:
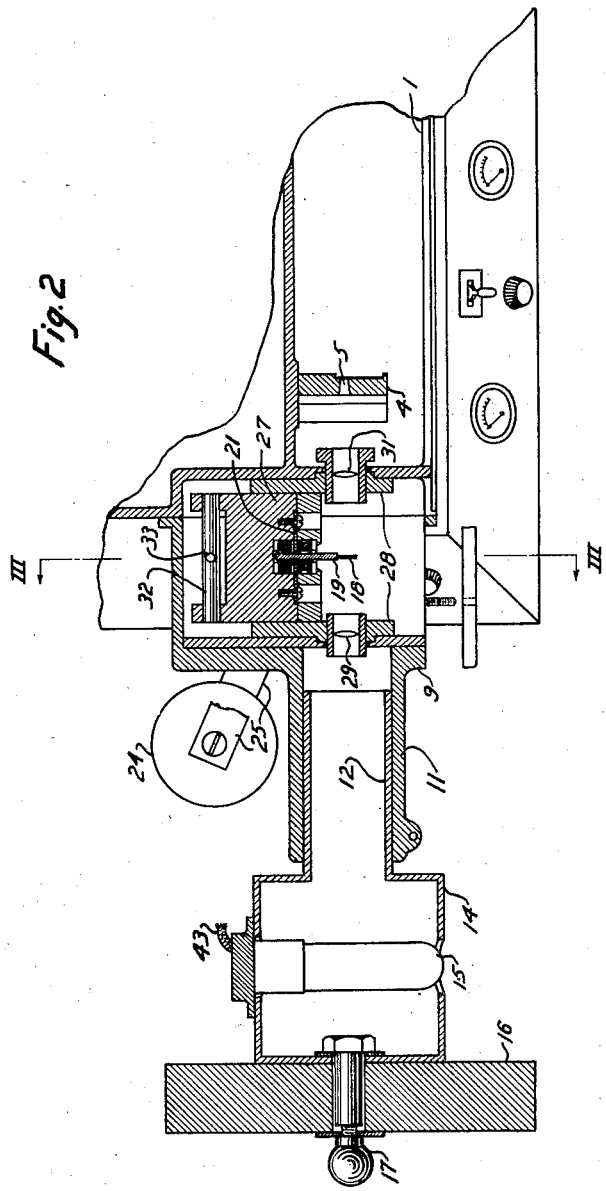
Fig. 2 is a horizontal view partially in section of the embodiment of Fig. 1 along the lines II—II.

Referring to the figures, a main cabinet portion 1, having a light-tight door 2, is equipped with film traversing means which may desirably consist of sprockets 3 and 4, driven by an appropriate power source, such as an electric motor, not shown, and equipped with appropriate stripper rolls, as indicated. A recording member 4 having a recording-light aperture is likewise provided, which may desirably be provided with a felt covering on the film carrying surface, in which is the recording aperture 5, and against which the friction fingers 6 bear. Supply and rewind reels 7 may also conveniently be provided according to the prior art, from which the film 8 is led and returned.

The recording system is incorporated in a tube member attached to the side of the cabinet 1 as indicated. This tube member is formed of a material having a definite amount of elasticity and may desirably consist of a square portion 9 within which the light shutter and lens systems are carried, and a tubular extension 11, acting as a support for a concentric member 12, to which is attached a lamp house 14 having an exciter lamp 15 therein. A weight member 16, desirably weighing a number of pounds is attached to the lamp house 14 by a bolt member 17.

The shutter member is contained within the chamber 9, and desirably consists of a blade 18 attached to an armature member 19, which is carried upon a spring support 21 within the field between pole pieces 22. A pair of coil members 23 are provided to which the vibratory current is fed, and which cause the armature 19 and the associated shutter blade 18 to vibrate by the well known electro-magnetic action of the so-called "figure eight" magnetic circuit. The flux for the magnetic field is provided by a field coil 24 having a core, and yoke members 25. The magnetic circuit is completed by auxiliary yokes 26 between the main yokes 25 and the pole pieces 22. The pole pieces 22 and the coil members 23, as well as the spring support 21 are attached to a non-magnetic frame member 27. The frame-member 27 is equipped with a pair of journal plates 28 having cylindrical extensions entering into recesses respectively in the cabinet member 1 and the chamber member 9 as shown, and surrounding the lens members 29 and 31 in their respective mounts.

A crossbar member 32 is provided mounted in ears at the rear of the frame member 27, and cooperating with a regulating screw 33 having a head 34 outside of and at the top of the chamber member 9. The head 34 is desirably graduated and cooperates with a pointer 35, to show the setting of the shutter blade.

In the operation of this device light from the filament 35, which filament is preferably a straight, linear, wire, positioned horizontally within the chamber 14, and nearly parallel to, but at a small angle to, the shutter blade 18, impinges upon the lens 29, by which it is brought to a focus to form an aerial image approximately in the plane of the shutter blade 18. From this plane the light diverges until it strikes the lens 37 by which it is again converged and brought to a focus upon the film 8 through the light aperture 5. Upon the film 8 it thus forms a very narrow line of light of relatively high intensity, which exposes the film. The shutter blade 18 is moved across the aerial image by movement of the armature 19 under the control of vibratory currents from an appropriate sound source such as a microphone and amplifier system.

Figure 3:
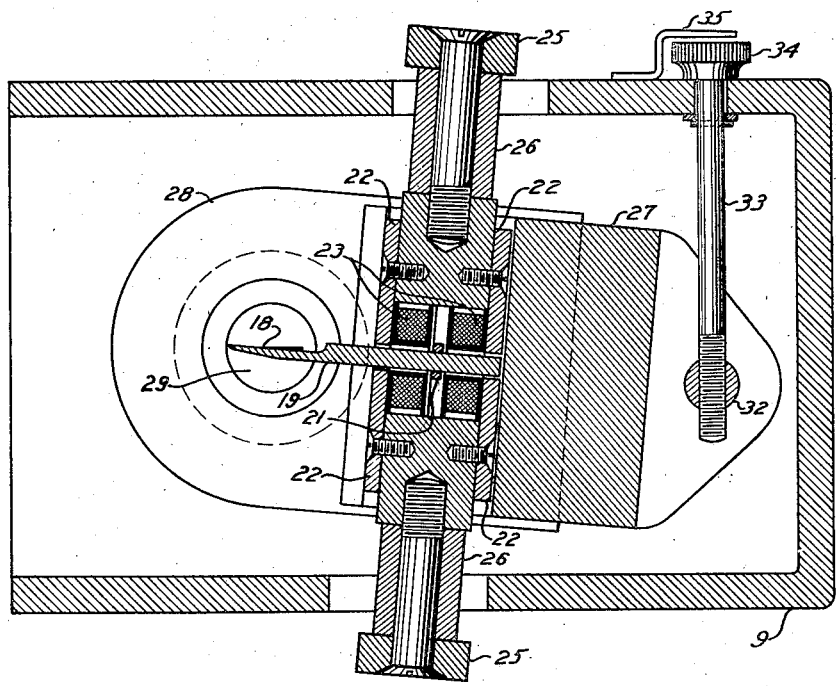
Fig. 3 is a sectional view of the shutter member, driving mechanism and regulating mechanism along the lines III—III of Figs. 1 and 2.

Because of the angle between the edge of the shutter 18, and the center line of the aerial image, as indicated in Fig. 3, more or less of the image is cut off, and only the remaining portion is brought to a focus upon the film 8 at the gate 5. Accordingly during a peak of a sound vibration, the armature 19 and shutter 18 may be raised, and a maximum portion of the aerial image obscured, in consequence of which, only a narrow portion of the sound track on the film 8 is exposed. At the following valley of the sound vibration, the shutter 18 is moved downward by the armature 19 and a greater portion of the aerial image is exposed, and focused upon the sound track on the film 8 resulting in a wider exposure track upon the film. This produces the series of hills and valleys characteristic of the variable area sound track upon the film 8.

It is obvious that a given amount of sound energy input to the coils 23, and the corresponding amount of movement of the armature 19 and shutter 18, will produce a greater or a less range between the hills and valleys of the sound record upon the film 8, according to the angle between the edge of the shutter 18 and the aerial image. This angle is adjustable by means of the screw 33, under the control of the graduated head 34 and pointer 35. Thus a movement of the head 34 to the right lifts the crossbar 32 and reduces the angle between the edge of the shutter 18 and the aerial image so as to increase the amplitude of the record for a given sound energy input, whereas a movement of the head 34 to the left increases the angle, and reduces the amplitude of the record.

The traversing of the film 8 through the recording machine by means of the pulleys 3 requires the application of power, which is preferably obtained through gears from an electric motor. Even the best of gears tend to introduce vibration in the machine, which vibration may be transferred through the chamber 9, and sleeves 11 and 12 to the lamp house 14 and lamp 15 resulting in a tendency toward a troublesome vibration of the filament 35, which because of the produced variation in position of the aerial image varies the amount of coverage, independently of the movements of the shutter blade 18, thus introducing into the record a vibration corresponding to the rate of vibration both of the lamp house 14 and of the filament 35.

The weight 16 attached to the lamp house 14 serves as a damping means to reduce the tendency of vibration both of the lamp house 14, and the associated structures, and the filament 35. This is partially secured by a damping action which absorbs the energy of the vibration, and also by a reduction of the natural period of the lamp house and its supporting structures to a sub-audible frequency, so that any residual effect of the vibration, is not audible from the film record.

The lamp house 1 is conveniently mounted upon a substantial base member 38, which is desirably equipped with a broad heavy bottom. The base member 38 is desirably also equipped with the requisite indicating and control members for the recorder, including a milli-ammeter 39, connected to the field magnet coil 24 by leads 41 and an ammeter 42 connected in the circuit of the leads 43 to the exciter lamp 15. The lamp current is desirably regulated by means of a rheostat 44, the magnet current is desirably regulated by a rheostat 45, and a switch member 46 serves to transfer the milli-ammeter 39 to other circuits when desired.

The system of this invention thus provides a simple and convenient device for recording sound vibrations photographically upon film, in which simple mechanical means adjust the amplitude of the sound record, independently of the amplitude of the input sound vibrations. In addition the influence of random vibrations from other sources is minimized, and a convenient simple control and indicating system is provided.

While there is here shown but a single embodiment of the device of this invention, it is possible to produce still other embodiments without departure from the inventive concept, and it is, therefore, desired that only such limitations shall be imposed upon the appended claims as are stated therein, or required by the prior art.

The invention claimed is:

1. A light valve system comprising means for producing a line of light, a shutter member positioned at an angle to the line, and adapted to be vibrated to obscure more or less of the line, means for focussing the line upon a recording film, and means for moving the shutter comprising a coil, an armature cooperating between said coil and said shutter, a field magnet structure cooperating with said armature and said coil, a frame member for said armature coil, having journal members about an optical axis at right angles to said shutter, and means for moving said frame and associated structures about said optical axis comprising a graduated adjusting member.

2. Apparatus for sound recording comprising a film chamber, means for traversing sensitive film therethrough, an exciter lamp, an optical system for focussing light from said exciter lamp, upon said film and for producing an aerial image as a step in said focussing, a shutter blade cooperating with the said aerial image, a magneto-electric system for operating said shutter blade, and means for maintaining said chamber, lamp, optical system and blade in alignment, comprising an elastic member between said film chamber and said exciter light and a damping weight attached to said exciter light.

3. Apparatus for sound recording, comprising a record moving means, having gear members therein, an exciter lamp, means for impressing light from said exciter lamp upon said record, means for controlling the impressed light upon said film in accordance with sound vibrations, and means for controlling other vibration records upon said film, comprising a weight member adapted to the dual purpose of absorbing vibrations, and reducing the natural period of the device to a subaudible frequency.

4. Light system comprising a record supporting member, means for supplying light for a film record in said member, and means for supporting said light supplying means from said record supporting member, said supporting means having elastance and damping so related as to reduce the vibration of said light supplying means which would otherwise be due to vibration of said record supporting member.

5. Apparatus for sound recording, comprising a record medium supporting member, a lamp house supported thereby and having an exciter lamp therein, and means for controlling the natural vibration period thereof, comprising an elastic connection between said lamp house and said container, and a damping weight attached to said lamp house.

6. A sound recording system comprising a film chamber, means for traversing sensitive film therethrough, an exciter lamp, an optical system for focussing light from said exciter lamp upon said film, and producing an aerial image as a step in said focussing, a shutter blade cooperating with the said aerial image, a magneto-electric system for operating said shutter blade, an input system for said magneto-electric system comprising a microphone and amplifier members, and means for maintaining said chamber, lamp, optical system and blade in alignment, comprising an elastic member between said film chamber and said exciter light and a damping weight attached to said exciter light, a base member for steadying said film container having openings therein, and circuit indicating and control members positioned in said openings and connected in circuit with said microphone and amplifier system, said exciter lamp, and said magneto-electric device.

7. A sound on film recorder comprising an electromagnet, an armature carried thereby having an optical element, a lens tube at each side of said optical element and a pivotal support for said electro magnet surrounding each of said lens tubes, and a field magnet for said armature and laterally disposed from said lens tubes, whereby the optical axis through said lens tubes does not pass through said field magnet.

8. A sound on film recorder comprising a coil, an armature therefor, means for supporting said armature in the field of said coil, an optical element carried by said armature, means for supporting said coil, armature and optical element as a unit, and pivotally adjustable means co-operating with said last-mentioned supporting means for angularly adjusting the position of said optical element.

9. A sound on film recorder comprising an electro magnet, an armature therefor having an optical element, means for supporting said armature in the field of said electromagnet, said electromagnet having eccentric thereto opposed circular bearing members, a casing enclosing said electromagnet and provided with opposed walls having apertured circular bearing surfaces co-operating respectively with said first-mentioned cylindrical bearing members, a source of light and a lens on one side of said optical element, a lens and the film to be recorded on the other side of said optical element, the optical path including said light source and both of said lenses passing through said apertured walls without passing through said electromagnet, and a hand operated device connected to said electromagnet for adjusting the position of said optical element.

10. A sound on film recorder comprising a coil embracing an armature having a light intercepter, and a lens tube with means for pivotally supporting said coil, said armature and said light intercepter.

11. A sound on film recorder comprising an electromagnet having a light intercepter, a lens tube on each side of said intercepter for pivotally supporting said electromagnet, and supporting means laterally extending from said lens tubes for supporting said electromagnet away from said lens tubes.

12. Light valve system comprising a field magnet, an armature therefor having a light shutter projecting into a light path, a coil surrounding said armature, and means for supporting said field magnet for arcuate motion to vary the position of said shutter in the light path.

13. In a light valve system, light valve apparatus for a lens system having an optical path, said apparatus comprising an armature having a light shutter in said path, a coil around said armature for actuating said armature, and means for supporting said coil and shutter for arcuate motion about an axis in said path.

JAMES ARTHUR MILLER.